United States Patent Office 3,095,282
Patented June 25, 1963

3,095,282
PROCESS FOR RECOVERING VALUES FROM ORES CONTAINING CLAY
William Page Wilson, Carlsbad, N. Mex., assignor to United States Borax & Chemical Corporation, Los Angeles, Calif., a corporation of Nevada
No Drawing. Filed Feb. 26, 1959, Ser. No. 795,604
1 Claim. (Cl. 23—312)

This invention relates as indicated to a process for treating ores containing clay and has particular reference to a method for treating potash-bearing ores having clays which form slimes that interfere with separation of the values.

In the processing of sylvinite ores containing on the order of 2–6% clays, this tendency to form slimes is especially pronounced.

Sylvinite ores consist mainly of KCl, NaCl, some minor ingredients and up to 6% clay. The clay interferes with recovery of the potash, whether the process be flotation, heavy media separation, or dissolution. In flotation processes the slimes absorb the flotation reagents; in differential settling in heavy media the slimes interfere with the settling rates; and in dissolution processing the slimes absorb up to five times their weight in potash saturated brine and interfere with thickening and filtration. Thus regardless of the method used to process the ore, it becomes necessary to provide a means whereby the clay does not interfere in the extraction of the values.

It is therefore the principal object of this invention to provide a new and economical method for removing interfering clay slimes during the processing of potash-bearing ores.

Other objects will appear as the description proceeds.

To the accomplishment of the foregoing and related ends, the invention then comprises the features hereinafter fully described and pointed out in the claim, the following description setting forth in detail certain illustrative embodiments of the invention, these being indicative, however, of but a few of the ways in which the principle of the invention may be employed.

Broadly stated, the present invention comprises the method of treating sylvinite ores containing slime-forming clays which comprises, in combination, crushing said ore and dissolving the crushed ore in an aqueous brine solution, said brine being saturated with respect to NaCl and unsaturated with respect to KCl, whereby the KCl of the sylvinite ore dissolves in said brine solution and the NaCl of the sylvinite ore remains substantially undissolved and the clay of said ore remains substantially suspended in said solution, decanting the brine solution containing the suspended clay and undissolved NaCl, adding to the decanted brine from about 0.0005 to about 0.01% based on the weight of the ore of a flocculent selected from the group consisting of the polymers of acrylic acid derivatives and polymers of methacrylic acid derivatives, whereby the suspended clay adheres to the undissolved NaCl and rapidly settles out and separating the substantially clear brine solutions from the clay-coated NaCl.

It is important to note here several important factors in the foregoing broadly stated paragraph. First, attention is directed to the fact that the crushed ore is subjected to dissolution in a brine solution which is saturated with respect to NaCl and unsaturated with respect to KCl. It is immaterial to the present invention what temperature is used in the dissolving of the ore as long as the brine solution at the particular temperature used is saturated with respect to the NaCl and unsaturated with respect to KCl. Thus dissolution can take place at room temperature, 100° F. or 212° F. as long as the brine solution is made up as described. This is necessary since under these conditions the KCl of the ore will go into solution and the NaCl of the ore will remain behind as undissolved particles. In the preferred embodiment of my invention I use a brine solution which is saturated with respect to NaCl and unsaturated with respect to KCl at about 90–110° F. This brine solution will remain saturated with respect to NaCl when heated up to a temperature of about 220° F., while at the same time its ability for dissolving KCl increases at the higher temperature. Second, it will be noted that after dissolution the brine which has become saturated with respect to the KCl is decanted and the solids (undissolved NaCl particles and clay) are carried along with the brine. The presence of the undissolved particles of NaCl in the decanted liquor is important to the present invention. I have found that the addition of the flocculating agent to a decanted brine solution containing only suspended clay and no undissolved NaCl particles causes the clay to flocculate and settle slowly; however, addition of a flocculating agent to a decanted brine containing undissolved particles of NaCl causes the clay to adhere to the NaCl particles which fall like shot, and which settle in about one-tenth the time to about one-half the volume occupied by the clay which was flocculated without the presence of undissolved NaCl particles.

Referring now to the flocculating agent applicable to the present invention, as stated in the above broadly stated paragraph I use the polymers of acrylic or methacrylic acid derivatives, for example, acrylic acid, methacrylic acid, the alkali metal and ammonium salts of acrylic acid or methacrylic acid, acrylamide, methacrylamide, the aminoalkyl acrylates, the aminoalkyl acrylamides, the aminoalkyl methacrylamides and the N-alkyl substituted aminoalkyl esters of either acrylic or methacrylic acids.

In the process of preparing potash ores for flotation the ore is scrubbed and the clay is removed with brines saturated with respect to both KCl and NaCl. This is done in order to save flotation reagent which would be taken up by the clay. However, this also produces the problem of reclaiming the saturated brine from the slime-forming clays. By practicing the present invention this latter difficulty can be readily overcome. Fine NaCl which is separated from the KCl during the flotation process can be added to the brine containing the clay along with one of the aforementioned flocculating agents. Due to the flocculating agent the clay will adhere to the particles of NaCl thus improving the settling velocity and filtering characteristics of the clay.

So that the present invention is more clearly understood, the following example is given:

I

Fifty pounds of —4 mesh sylvinite ore was put into a brine solution which was saturated with NaCl and KCl at 100° F. The brine and ore were heated with agitation to about 220° F. until the solution became substantially saturated with KCl. The brine solution was then decanted into a second vessel and about 0.005% of sodium polyacrylate was added. The clay flocculated and settled to the bottom of the vessel in about 15 seconds. Examination of the floc showed that it consisted of salt particles covered with adhering clay.

Using the present method in the commercial extraction of potash values is extremely easy and cheap. Using the present invention I have found that the potash loss due to retention by the slime-forming clays is reduced by 50% or better, filtration rate is increased tenfold and the need for settling and thickening tanks is greatly reduced.

Other modes of applying the principle of the invention may be employed provided the features stated in the following claim or the equivalent of such be employed.

I, therefore, particularly point out and distinctly claim as my invention:

The method of treating sylvinite ores containing slime-forming clays which comprises, in combination, crushing said ore, scrubbing the crushed ore with a brine saturated with respect to both KCl and NaCl, removing the clay from the ore along with said brine, submitting the scrubbed ore to a flotation process wherein the KCl and NaCl are separated, adding at least some of the separated NaCl and from about 0.0005 to about 0.01% based on the weight of the ore of a flocculent selected from the group consisting of the polymers of acrylic acid derivatives and polymers of methacrylic acid to the brine containing the suspended clay, wherein the suspended clay adheres to the particles of NaCl and separating the brine from the clay-coated NaCl.

References Cited in the file of this patent

UNITED STATES PATENTS

| | | |
|---|---|---|
| 2,702,121 | Colin et al. | Feb. 15, 1955 |
| 2,788,257 | Duke | Apr. 9, 1957 |

FOREIGN PATENTS

| | | |
|---|---|---|
| 154,799 | Australia | Apr. 26, 1951 |
| 163,501 | Australia | Aug. 7, 1952 |